United States Patent [19]

McMennamy

[11] Patent Number: 4,750,576

[45] Date of Patent: Jun. 14, 1988

[54] CONTINUOUS FLOW WEIGHING APPARATUS

[76] Inventor: John A. McMennamy, 1320 Kennesaw Mountain Industrial Pkwy., Marietta, Ga. 30060

[21] Appl. No.: 937,834

[22] Filed: Dec. 4, 1986

[51] Int. Cl.$^4$ ............................................. G01G 13/22
[52] U.S. Cl. ...................................... 177/88; 177/91
[58] Field of Search ....................... 177/90, 91, 83–88

[56] References Cited

U.S. PATENT DOCUMENTS

| | | | |
|---|---|---|---|
| 511,647 | 12/1893 | Outcalt | 177/84 X |
| 1,188,215 | 6/1916 | Staaf | 177/83 |
| 1,412,410 | 4/1922 | Lindau | 177/83 |
| 2,613,905 | 10/1952 | Muskat | 177/85 |
| 2,624,538 | 1/1953 | Schrock et al. | 177/90 X |
| 3,921,737 | 11/1975 | Pleus | 177/86 |

*Primary Examiner*—George H. Miller, Jr.
*Attorney, Agent, or Firm*—Newton, Hopkins & Ormsby

[57] ABSTRACT

A continuous flow weighing apparatus including a support frame, a weighing drum rotatably mounted to an axle and having a plurality of weighing compartments each having an eccentric center of gravity. A balance beam is rotatably mounted on each side of the weighing drum to the support frame. One end of the balance beam is fixedly mounted to the drum axle while the other end is adapted to receive a counterweight. A releasable stop means is provided comprising a drum stop mounted to the exterior side of each weighing compartment. A fixed latch bar and a pivotal latch bar are attached to the support frame and are so configured as to form a notch for receiving the drum stops. The drum stops and the sides of the fixed and pivotal latch bars have inclined mating surfaces which form an angle from the horizontal to give a horizontal resultant force. A horizontal resultant force reduces weighing errors by stabilizing the center of gravity.

12 Claims, 3 Drawing Sheets

CONTINUOUS FLOW WEIGHING APPARATUS

BACKGROUND OF THE INVENTION

1. Field of the Invention.

This invention relates to a weighing apparatus, more particularly to an apparatus for receiving and delivering continuously a predetermined weight of loose material.

2. Description of the Prior Art.

Many different types of continuous weighing machines have been developed for weighing loose material such as grain, vegetables and the like. In recent years these machines have incorporated more complex electronic mechanisms in an attempt to increase weighing sensitivity and accuracy. The newer electronic weighing systems have become increasingly expensive to manufacture and require frequent maintenance and fine tuning to maintain the desired degree of sensitivity.

SUMMARY OF THE INVENTION

A major object of the present invention is to provide a continuous flow weighing apparatus having increased accuracy but which at the same time is relatively easy and inexpensive to manufacture.

Another object of the present invention is to provide a novel releasable stop means for controlling the rotation of a weighing drum during the weighing process.

And yet another object of the invention is to provide a stop means which can be used to retrofit currently existing weighing drums.

The continuous flow weighing apparatus of the present invention comprises a weighing drum having a plurality of weighing compartments, each having an eccentric center of gravity. The drum is rotatable about a central axial rod which is mounted to a support frame via rotatably mounted balance beams. A fixed stop bar and a pivotal latch bar are mounted to the support frame, the latch bar positioned on top of the fixed stop bar to form a downwardly open notch. A drum stop is situated on the exterior side of each compartment and so positioned to slidably engage the notch formed by the fixed stop bar and latch bar when brought into alignment therewith as the drum rotates about its central axis. A biasing means maintains the pivotal latch bar flush with the fixed stop bar when the drum stop is engaged in the notch. The balance beams are rotatably mounted to the support frame. Each balance beam has one end secured to the axial rod of the weighing drum. The opposite ends of the balance beams are connected by a cross bar which is adapted to receive any one of a series of counterweights for determining the discharge weight of the material being weighed.

The downwardly open notch and the wheel drum stop have inclined mating surfaces which form an angle from the horizontal to give a horizontal resultant force.

DETAILED DESCRIPTION OF THE DRAWINGS

Figure 1:
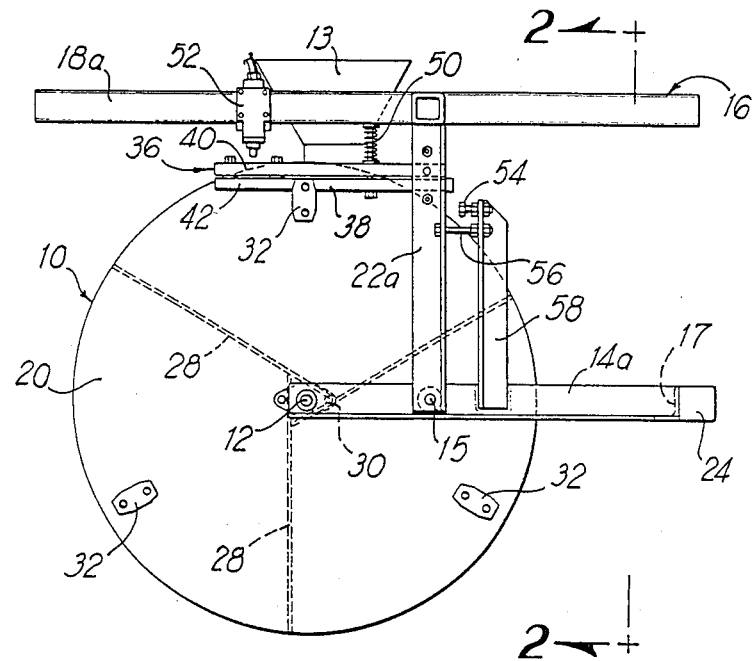
FIG. 1 is a front elevation showing the continuous flow weighing apparatus of the present invention.
Figure 2:
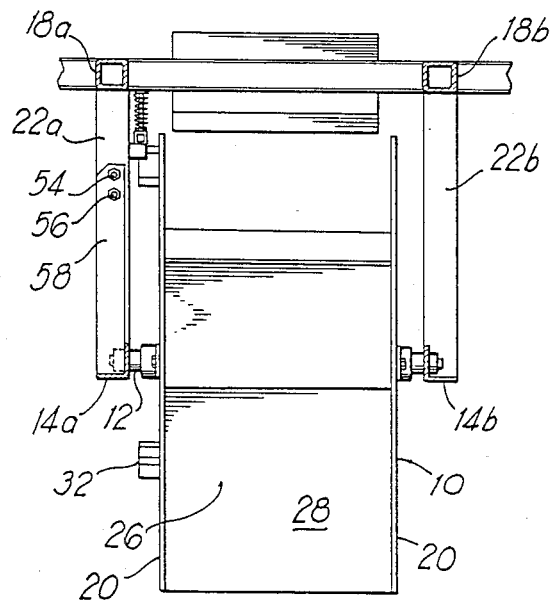
FIG. 2 is a side elevation cross-section taken along lines 2—2 of FIG. 1.

The continuous flow weighing apparatus of the present invention illustrated in FIG. 1 comprises a weighing drum 10 rotatably mounted on drum axle 12. Support frame 16, which supports the entire system, includes a pair of horizontally extending beams 18a and 18b, illustrated more clearly FIG. 2, which are substantially parallel and spaced far enough apart to be positioned beyond the pair of spaced apart side walls 20 of weighing drum 10. Each horizontal beam 18a and 18b has a corresponding downwardly extending arm 22a and 22b fixedly mounted thereto at one end, and rotatably mounted to balance beams 14a and 14b at the other end. Balance beams 14a and 14b are rotatably mounted at points 15a and 15b with one end of each beam secured to drum axle 12 and the opposite ends being connected by cross bar 17. Counterweight 24 is attached to cross bar 17 and is adjustable to permit the delivery of any desired predetermined weight of the loose material.

Each weighing compartment 26 is defined by a pair of spaced apart exterior side walls 20 and interior walls 28 extending therebetween. Weighing drum 10 is illustrated in FIG. 1 as having three weighing compartments 26, however, the number of weighing compartments can be modified according to preference. Weighing compartment 26 has an eccentric center of gravity 30 to control the rotation of weighing drum 10 in a clockwise direction which will be discussed in more detail below.

Figure 3:
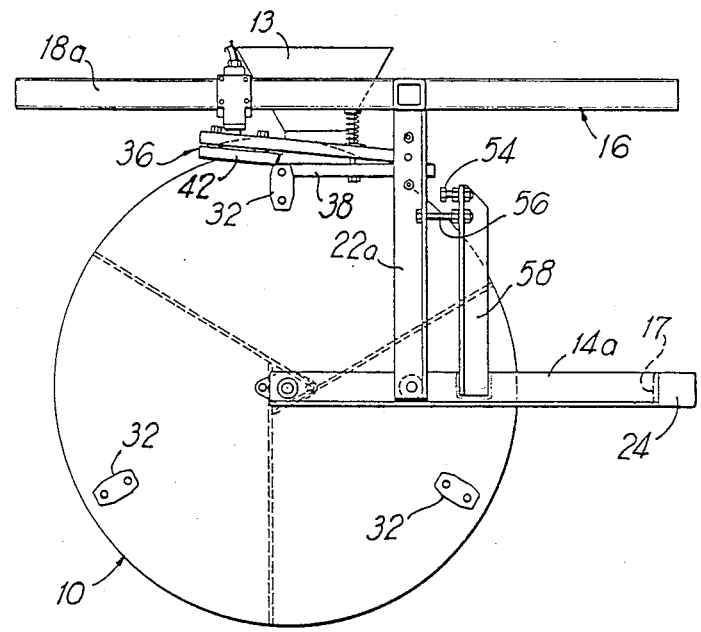
FIG. 3 shows the apparatus of FIG. 1 prior to the engagement of the drum stop in the stop receiving means.
Figure 4:
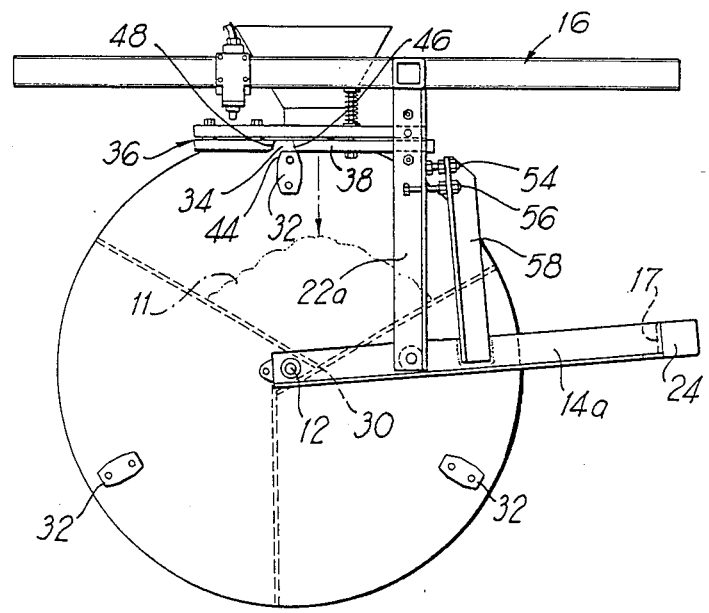
FIG. 4 shows the apparatus of FIG. 1 just prior to discharge of the material being weighed from the weighing compartment.
Figure 5:
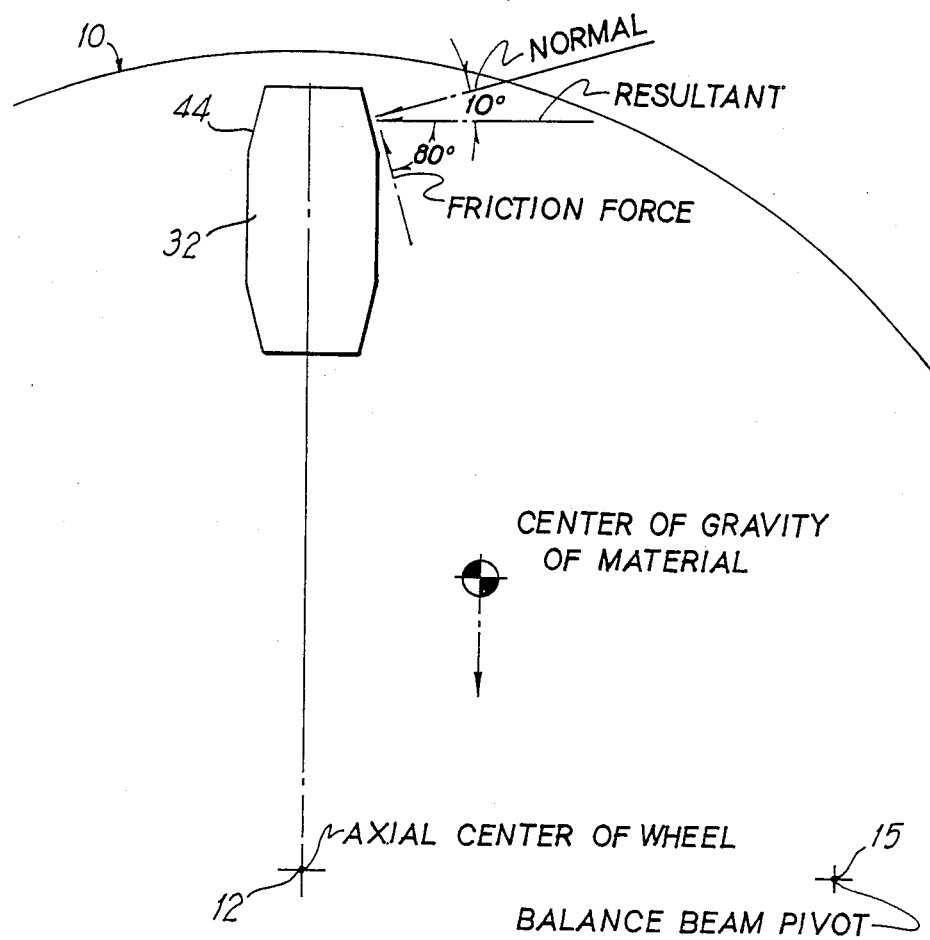
FIG. 5 is a force diagram showing the resultant horizontal force of the inclined mating surfaces of the releasable stop mechanism.

The releasable stop mechanism comprises a drum stop 32 situated on the exterior side of each weighing compartment 26 and so positioned to slidably engage a notch 34. Notch 34 is formed by positioning pivotal latch bar 36 on top of fixed stop bar 38 as illustrated in FIG. 4. Drum stop 32 is constructed of ultra high molecular weight polyethylene (UHMW), however, any type of high impact plastic or similar material may be used. Pivotal latch bar 36, as illustrated therein is pivotally attached to arm 22a and is constructed by coupling an elongated upper stop bar 40 to lower stop bar 42, lower stop bar 42 being approximately ⅓ the length of upper stop bar 40. Pivotal latch bar 36, however, could be molded as a single unit if so desired. Pivotal latch bar 36 and fixed stop bar 38 can be constructed of any durable material. Steel was used for the preferred embodiment illustrated in FIGS. 1-5. The sides of notch 34 and the top end surfaces of drum stop 32 are ground to form inclined mating surfaces drum stop surfaces 44, fixed bar surface 46, and pivotal latch bar surface 48. The angle of mating surfaces 44, 46 and 48 from the horizontal has been determined to be approximately 80°. As illustrated in the force diagram of FIG. 5, this angle has been found to give a horizontal resultant force which is approximately 10° from the normal force of inclined drum stop surface 44. The angle of the inclined mating surfaces will vary according to the coefficient of friction of the materials used to construct the releasable stop mechanism so that the resultant force is always horizontal. For example, the coefficient of friction for UHMW and steel is approximately 0.17 which requires an angle of about 10° to maintain a horizontal resultant force. The tangent of the angle should always equal the coefficient of friction. If the resultant force is not horizontal, a vertical force component is introduced which varies with the center of gravity location and causes weighing errors.

Pivotal latch bar 36 is biased downwardly by spring 50. As weighing drum 10 rotates to discharge material 11, drum stop 32 of the next weighing compartment 26 forces pivotal latch bar 36 upwardly until drum stop 32 is aligned and then engaged in notch 34. A counter-mechanism 52 can be mounted on horizontal beam 18a for counting the number of discharged units of material 11.

The rotational movement of balance beam 14a about point 15 is limited by the length of bolts 54 and 56. These bolts are attached to rod 58 which extends upwardly from balance beam 14a. Bolt 54 is fixedly secured at one end to rod 58, the other end extending approximately half way between rod 58 and arm 22a to permit a limited counter-clockwise rotation of balance beam 14 about point 15. Bolt 56 is fixedly secured to rod 58 at one end, the other end being slidably mounted through an aperture (not shown) in arm 22. The length of bolt 56 is that which is necessary to maintain balance beam 14a in a horizontal position.

In operation, the material 11 to be weighed, such as grain or any loose granular type material, is conveyed in a continuous flow through funnel 13 into weighing compartment 26. Funnel 13 is supported in its correct position by support frame 16. Prior to the addition of material 11, weighing drum 10 is in its upward position, as illustrated in FIG. 1, whereby drum stop 32 is engaged in notch 34 as formed by pivotal latch bar 36 and fixed stop bar 38. Pivotal latch bar 36 is maintained in its flush position on top of fixed stop bar 38 by spring 50.

The desired discharge weight of the material to be weighed has been determined and the appropriate counterweight 24 is attached to cross bar 17. As material 11 flows into weighing compartment 26, the entire weighing drum 10 increases in weight and drops downwardly, when the weight of counterweight 24 has been overcome (see FIG. 4). Balance beams 14a and 14b then rotate counterclockwise about point 15 until bolt 54 of rod 58 abuts arm 22a. The downward movement of weighing drum 10 disengages drum stop 32 from notch 34 and the eccentric center of gravity causes drum 10 to rotate clockwise.

After material 11 is discharged into an appropriate container, the weight of the drum is decreased and it moves upwardly as the next empty weighing compartment 26 is rotated into position under funnel 13. As drum 10 rotates, the next drum stop 32 pushes pivotal latch bar 36 upwardly, as illustrated in FIG. 3, until drum stop 32 becomes engaged in notch 34 and the next compartment 26 is ready for receiving another batch of the material 11 to be weighed. Each upward movement of pivotal latch bar 36 actuates counter-mechanism 52 which in turn can be attached to any appropriate recording instrument for recording either the total weight of material passing through or the number of discharged units of material 11.

Although the invention has been described with a particular arrangement of elements, other arrangements are within the scope of the invention, which is intended to be limited only by the scope of the appended claims.

What is claimed is:

1. A continuous flow weighing apparatus for weighing loose material comprising:
   a support frame;
   a rotatable weighing drum having a plurality of weighing compartments each having an eccentric center of gravity for determining the direction of rotation of the drum after the addition of the material to be weighed;
   a notched latch bar pivotally mounted to the support frame;
   a drum stop attached to the weighing drum and so positioned to be slidably engaged by the latch bar notch when brought into alignment therewith as the drum rotates to bring an empty weighing compartment into position for receiving loose material to be weighed and disengaged by the weighing drum moving downwardly following the addition of the weighed material;
   biasing means for biasing the latch bar towards the drum stop to facilitate the engagement of the drum stop in the latch bar notch; and
   a balance beam attached to the weighing drum and being rotatably mounted to the support frame, the beam being counterweighed for determining the weight of the material to be discharged.

2. The apparatus of claim 1 wherein the latch bar notch and the drum stop have inclined mating surfaces forming an angle from horizontal to maintain a horizontal resultant force while the material is being weighed.

3. The apparatus of claim 2 wherein the angle from horizontal is approximately 80°.

4. The apparatus of claim 1 wherein the balance beam further comprises a means for limiting the rotational movement of the balance beam.

5. The apparatus of claim 4 wherein the limiting means comprises an upwardly extending rod mounted to the balance beam and having at least one bolt slidably attached to the support frame.

6. The apparatus of claim 1 further comprising a counting means attached to the support frame and actuated by the pivotal latch bar.

7. A continuous flow weighing apparatus comprising:
   a support frame;
   a weighing drum having a plurality of weighing compartments each having an eccentric center of gravity, the drum being rotatable about a central axial rod;
   a fixed stop bar mounted to the support frame above the drum;
   a latch bar pivotally mounted to the support frame and so positioned above the fixed stop bar so as to form a downwardly open notch with the fixed stop bar when the pivotal latch bar is in its horizontal position;
   a drum stop situated on the exterior side of each compartment and so positioned to slidably engage the notch formed by the fixed stop bar and pivotal latch bar when the drum stop is brought into alignment therewith as the drum rotates about its central axis to bring an empty weighing compartment into position for receiving loose material to be weighted and disengaged by the weighing drum moving downwardly upon the addition of the weighed material;
   biasing means for maintaining the pivotal latch bar in its horizontal position; and
   a balance beam rotatably mounted to the support frame wherein one end is fixedly secured to the axial rod of the weighing drum and the other end has a counter weight for determining the discharge weight of the material being weighed.

8. The apparatus of claim 7 wherein the downwardly open notch and wheel drum stop have inclined mating surfaces forming an angle from horizontal to maintain a horizontal resultant force while the material is being weighed.

9. A releasable stop mechanism for a continuous flow rotary drum type apparatus having a plurality of weighing compartments comprising:
- a support frame;
- a drum stop for each weighing compartment adapted to attach to the rotary drum;
- a drum stop receiving member pivotally mounted to the support frame and having a notch for receiving and engaging the drum stop as the drum rotates, the drum stop and notch having engagable inclined mating surfaces for maintaining a horizontal resultant force as the material to be weighed flows into the weighing compartment and moves the drum downwardly to disengage the drum stop from the notch;
- means for selectively determining the weight of the discharged material; and
- means for controlling the direction of the drum rotation for discharging the weighed material.

10. The stop mechanism of claim 9 wherein the means for selectively determining the weight of the discharged material comprises a counterweighted balance beam attached to the weighing drum and being rotatably mounted to the support frame.

11. The stop mechanism of claim 9 wherein the means for controlling the direction of drum rotation comprises each weighing compartment having an eccentric center of gravity.

12. The stop mechanism of claim 9 wherein the inclined mating surfaces of the notch and drum stop form approximately an 80° angle from the horizontal.

* * * * *